United States Patent [19]
Burd

[11] Patent Number: 5,419,489
[45] Date of Patent: May 30, 1995

[54] MOBILE THERMOSTAT TO CONTROL SPACE TEMPERATURE IN THE BUILDING

[76] Inventor: Alexander L. Burd, 489 Boder St., Green Bay, Wis. 54302

[21] Appl. No.: 182,558

[22] Filed: Jan. 18, 1994

[51] Int. Cl.⁶ .............................................. G05D 23/00
[52] U.S. Cl. ........................................... 236/47; 236/51
[58] Field of Search ....................... 236/51, 47; 165/26

[56] References Cited

U.S. PATENT DOCUMENTS

| | | | |
|---|---|---|---|
| 5,299,430 | 4/1994 | Tsuchiyama | 236/51 |
| 5,326,027 | 7/1994 | Sulfsteoe | 236/51 |

FOREIGN PATENT DOCUMENTS 4288439  10/1992  Japan ...................................... 236/51

*Primary Examiner*—William E. Wayner

[57] ABSTRACT

The present invention is related to many space heating and cooling systems, which include central building heating and/or cooling source, such as boiler, chiller, furnace, air handling unit, etc. and which have at least one stationary room thermostat to control climate conditions in the building. It is suggested in addition to a stationary thermostat to use an extra thermostat, so called mobile thermostat, to provide flexible room air temperature control at any building location which is critical at the particular moment, including the rooms which do not have a stationary thermostats. This mobile thermostat has an authority, if it is necessary, to be override control of the stationary thermostat at any time and, therefore, to control room space heating and/or space cooling at any particular location to provide a required comfort in any room in the building. The mobile thermostat generates a signal which is transmitted to the master controller, which is installed on central building space heating and/or space cooling plant or on room space heating and/or space cooling unit. A signal through receiving means changes the output capacity of a building plant or room unit responsively to the signal from mobile thermostat to maintain a room air temperature at the particular location in accordance with a setpoint temperature of mobile thermostat.

4 Claims, 3 Drawing Sheets

MOBILE THERMOSTAT TO CONTROL SPACE TEMPERATURE IN THE BUILDING

BACKGROUND OF THE INVENTION

This invention is related to heating and cooling systems which are used to provide comfort in residential houses, institutional, commercial and other buildings. Although these buildings have different mechanical systems, they also have many similarities. All these buildings have some central heating and cooling plant and heating and cooling units in each room (space) where a comfort conditions should be maintained. Let us, for example, consider a residential house which has two floors. On the first floor it has a kitchen, family room, dining room and living room and on the second floor it has three bedrooms. The house has a central furnace and one room stationary thermostat located in the living room. The major purpose of the thermostat is to control air temperature in the building. However, this control in the considered example is insufficient and thus, can not satisfy customer's comfort requirements. In the considered residential house a living room is assumed as a representative room for an entire building to control comfort conditions in it. In other words, an assumption is made that if the air temperature in the living room is maintained according to a thermostat setpoint temperature, the temperatures in other rooms throughout the building are also at a comfort level. Needless to say, that it is not necessarily so, because the heat losses and heat gains change very individually in each room, depending on the area and orientation of the exposed walls and windows, as well as on a number of people in the room, etc.. Meanwhile, often during the day it is required to control air temperature in different rooms, rather than only in one representative room. For instance, at night it is desirable to control air temperature in some area on the second floor, where the bedrooms are. Sometimes it is desirable to control the air temperature not only in particular room, but in some particular location in the room, for example, in the nursery near the baby's crib or in the common area where the whole family is watching TV, etc.. Obviously, a stationary thermostat does not have a power to do this, because it is permanently installed in one particular (fixed) location. In reality, if it is necessary to maintain a given air temperature conditions in some other room, than where a stationary thermostat is installed, a thermostat setpoint temperature can be adjusted to satisfy temperature requirements at some remote location. However, this type of indirect control is more difficult to achieve and, of course, the accuracy of control and, because of it, the comfort is compromised. The use of mobile thermostat in this situation may provide more flexible control and, thus gives a possibility to maintain a required comfort conditions throughout a building at any time. However, it does not mean that stationary thermostat should be removed, because it is necessary to control house air temperature over the time when mobile thermostat is not used. Stationary thermostat will also be necessary for start up procedure, when a system is being adjusted to provide a predetermined level of heating and/or cooling distribution into the building.

Apparently, a possible area of application of the mobile thermostat is not limited only by residential buildings. In hospitals or nursery schools a mobile thermostat will be very useful to control room air temperature in any special location. For instance in a hospital with central heating and cooling system the mobile thermostat can control a hospital ward heating and/or cooling unit capacity to maintain a required air temperature at any point near a patient's bed, rather than at one fixed location in the room. Or in a nursery school mobile thermostat can control air temperature closer to the area, where children are playing. In a few worlds, mobile thermostat provides flexible air temperature control and allows to maintain a better comfort conditions at any given location in a building at any time. In many cases, due to the more accurate temperature control, a mobile thermostat will allow to reduce energy consumption in a building and save energy. Although in the shown above examples a room air temperature control is discussed, the brought in the light matter has much more broad application. For instance, if necessary, not only a room air temperature, but a room climate (air temperature, humidity, etc.) can be controlled with the use of mobile temperature and humidity control sensor.

THE DESCRIPTION OF THE PREFERRED EMBODIMENTS

Figure 1:
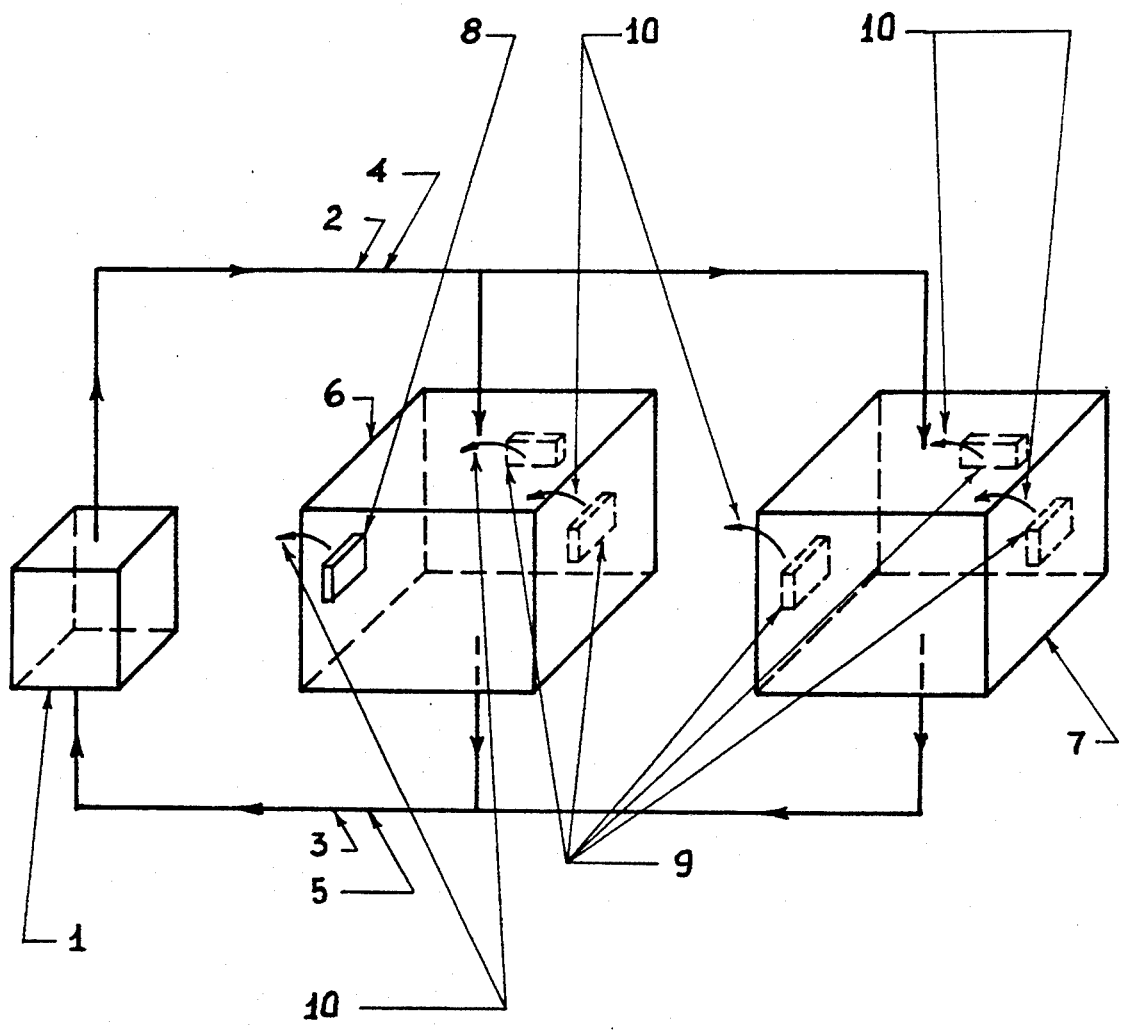
FIG. 1 shows the general arrangement for room air temperature control in air heating and cooling systems with stationary and mobile room thermostats.

The general arrangement fore, room air temperature control in air heating and cooling systems With stationary and mobile room thermostats is shown in FIG. 1. In FIG. 1, reference numerals denote as follows:

1—central furnace or air handling unit;
2—supply ductwork;
3—return ductwork;
4—hot and/or cold air;
5—warm air return;
6—room #1;
7—room #2;
8—location of the room heating and/or cooling stationary thermostat;
9—variable location of the room heating and/or cooling mobile thermostat;
10—signal to control furnace or air handling unit.

The control of air temperature in room #1 and room #2 is implemented by a stationary thermostat 8 which is installed on the internal wall in room #1. The installation of the stationary thermostat 8 on the internal wall is preferred over the external wall of the room to exclude the impact from cold (or warm) external walls on controlled parameter and to stabilize the controlled parameter (air temperature). When air temperature in room #1 is different than a thermostat 8 setpoint temperature value, a thermostat generates signal 10, which is proportional to the said difference, signal 10 then is sent to furnace 1 or to air handling unit 1 to increase or reduce their output capacity and thus, to increase or reduce amount of heat or cool delivered by air through a ductwork 2 to the room #1 to satisfy a temperature call from thermostat 8. FIG. 1 a 1 so shows the variable location (three locations) of mobile thermostat 9 to control air temperature in room #1 and in room #2. A mobile thermostat can be located in different places of room #1 and room #2 depending on particular requirements to air temperature value in particular places of these rooms.

As soon as mobile thermostat 9 is energized, it overrides control of a stationary thermostat 8. Suppose that mobile thermostat 9 is located somewhere in room #2 (on one of the walls). Also suppose, that air temperature in room #2 is somewhat different than mobile thermostat 9 setpoint temperature value. If it is so, mobile thermostat 9 generates signal 10, which is proportional to the said difference, then signal 10 is sent to furnace 1 or air handling unit 1 to increase or reduce their output capacity and, thus, to increase or reduce amount of heat or cool delivered by air through ductwork 2 to the room #2 to satisfy a temperature call from mobile thermostat 9. The same type of control will be implemented if mobile thermostat 9 is located on another wall in room #2, or somewhere in the middle of the room #2, or on another wall (different to one, where stationary thermostat 8 is) in room #1, or somewhere in the middle of the room #1 and so forth. The distinctive difference will be, that mobile thermostat 9 controls air temperature in the specific location in the room (rather than installed in one fixed location stationary thermostat 8) and this location may vary depending on current requirements. Clearly, mobile thermostat 9 will provide better Control in room #2, than stationary thermostat 8 located in room #1.

USA has a huge potential market for this type of control improvement due to the fact, that approximately 84 million housing units have air cooling and heating systems, which are controlled by one stationary thermostat.

Figure 2:
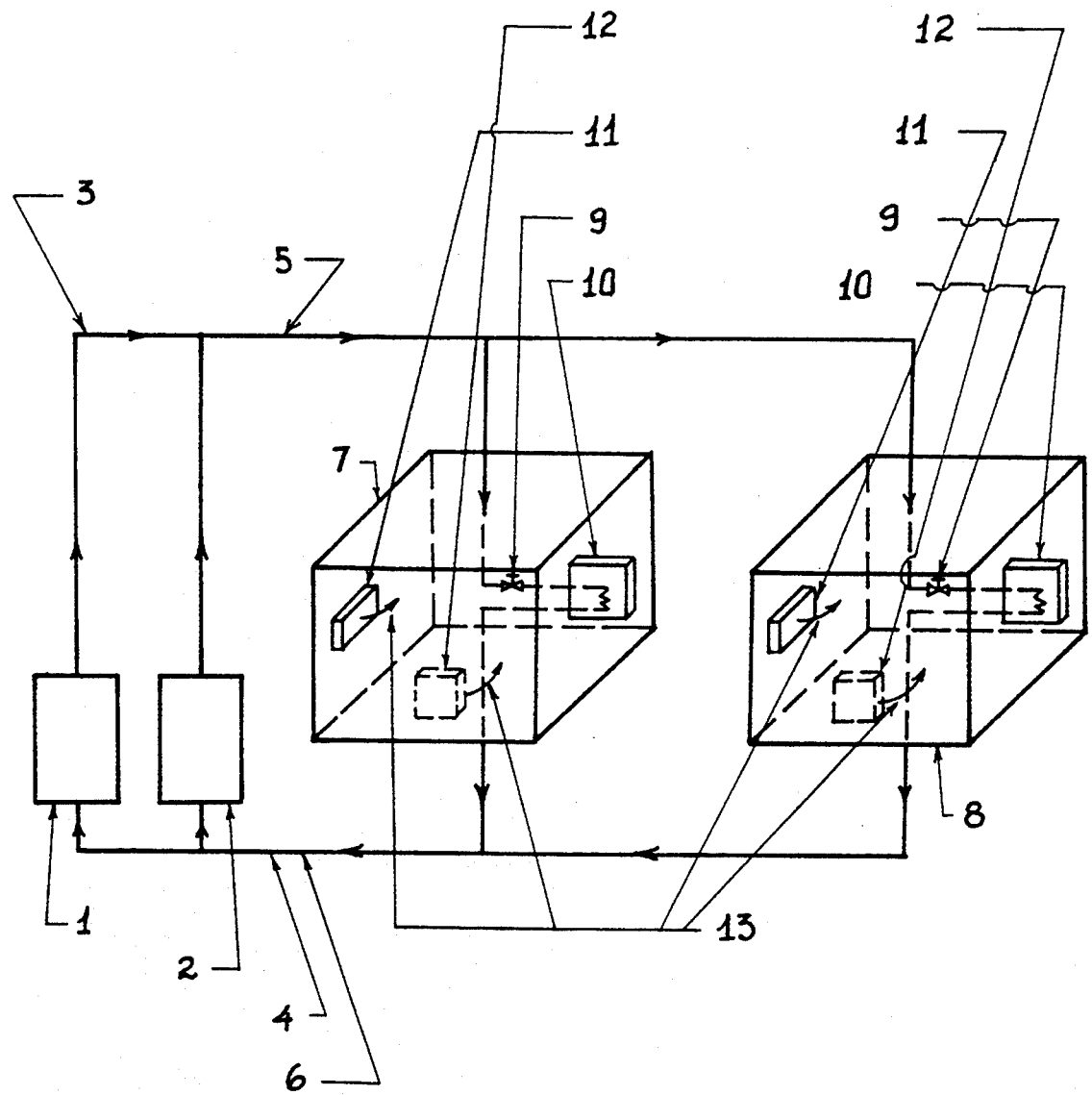
FIG. 2 shows the general arrangement for room air temperature control in water (steam) heating and cooling systems with stationary and mobile room thermostats.

FIG. 2 shows the general arrangement for room air temperature control in water (steam) heating and cooling systems with stationary and mobile room thermostats. In FIG. 2, reference numerals denote as follows:
1—central boiler;
2—central chiller;
3—supply hot water (steam) and/or chilled water:
4—return water (condensate);
5—supply piping;
6—return piping;
7—room #1;
8—room #2;
9—heating and/or cooling control valve;
10—heating and/or cooling unit;
11—location of room heating and/or cooling stationary thermostat;
12—variable location of room heating and/or cooling mobile thermostat;
13—signal to control valve of heating and/or cooling unit.

Each room has its own heating and cooling units 10, which receive heat and cool from central boiler 1 and chiller 2. Whenever air temperature in the room deviates from stationary 11 or mobile thermostat 12 setpoint temperature, a thermostat sends signal 13, proportional to a magnitude of said deviation, to control valve 9, which increases or reduces heating or cooling media flow rate through a unit to satisfy required air temperature value at a thermostat location. Therefore, if it is necessary to control air temperature in a room at different location than where stationary thermostat 11 is installed, it can be done with the use of mobile thermostat 12. As soon as control switched over to mobile thermostat 12, mobile thermostat 12 will override stationary thermostat 11 control. Meanwhile, under different circumstances, a stationary thermostat 11 will be still responsible for room air temperature control. However, as soon as mobile thermostat 12 is energized, it overrides control of stationary thermostat 11. As soon as mobile thermostat 12 is deenergized, control automatically gets back to stationary thermostat 11. Therefore, mobile thermostat 12 does not exclude the necessity of a stationary thermostat 11, but rather adds flexibility to a room air temperature control and enhances quality of this control.

Thus, it is understandable that conception of mobile thermostat has universal value similar to what a stationary thermostat conception has nowadays.

Figure 3:
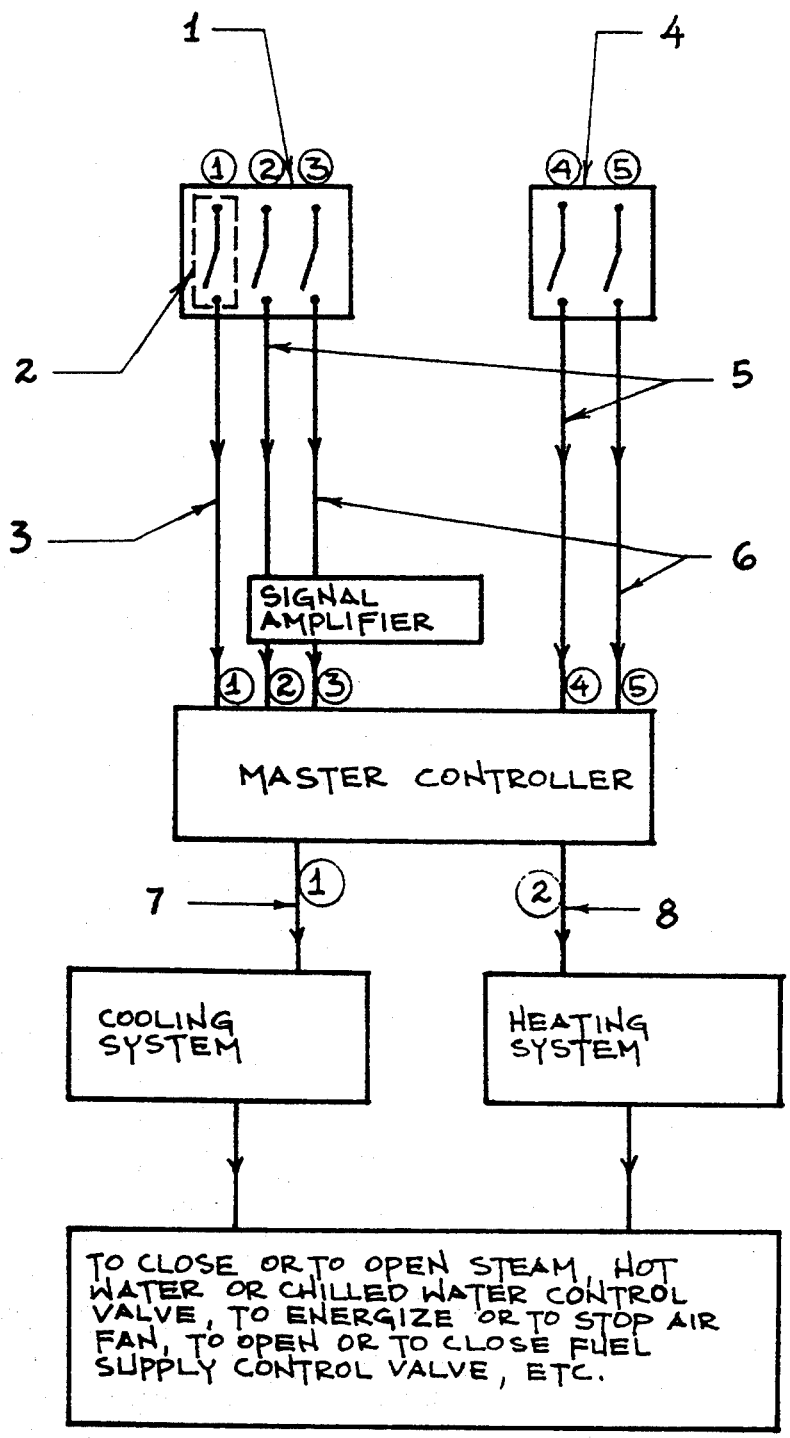
FIG. 3 shows the principal Signal diagram to control building heating and cooling system with stationary and mobile room thermostats.

FIG. 8 shows a principal signal diagram to control building heating and cooling system with stationary and mobile room thermostats. In FIG. 3, reference numerals denote as follows:
1—room space heating and/or cooling mobile thermostat with normally open switches;
2—switch to override control from stationary thermostat;
3—signal to override control from stationary thermostat (first signal);
4—room space heating and/or cooling stationary thermostat with normally open switches;
5—space heating and/or cooling mode signal (second and forth signals);
6—space heating and/or cooling mode signal (third and fifth signals);
7—resultant signal;
8—resultant signal.

The stationary room heating and/or cooling thermostat 4 has a normally open switches (contacts) and low and high level setpoint temperatures, the thermostat also has an indicative means to read the air temperature at the thermostat location, as well as a temperature of thermostat setpoint. Mobile thermostat 1 has the same standard features as the stationary one. At the same time, mobile thermostat is different from a stationary thermostat. Mobile thermostat 1 is not designed for installation in some particular place (for instance, on the wall), but it should be able to provide an accurate functioning while it is on the wall or on the table, or on the chair, or at some other location. Mobile thermostat 1 is a non inertial thermostat, which instantly responds to the change of the temperature at the thermostat location. Mobile thermostat 1 may use different energy sources, such as electricity, battery, etc. In comparison with stationary thermostat 4 mobile thermostat 1 has an extra switch. When this switch is closed, mobile thermostat 1 gets energized. As soon as it happens, mobile thermostat 1 permanently sends first signal 3 to a master controller, which has a number of ports for signal's input and output. When the master controller receives the first signal 3 from mobile thermostat 1, the master controller closes all its signal input ports, except of input ports which are dedicated to receive signals from mobile thermostat 1. As soon as it happened, mobile thermostat 1 overrides control from stationary thermostat 4. The master controller may also include a signal amplifier to enhance signals from battery operating mobile thermostat 1. When room air temperature at mobile thermostat 1 location is getting under the thermostat low level setpoint temperature (in heating mode) or above the thermostat high level setpoint temperature (in cooling mode), the mobile thermostat switch #2 is closed and mobile thermostat 1 generates the second signal 5, which is sent to the master controller. The master controller then sends resultant signal 7 to heating system and/or resultant signal 8 to cooling system to respectively increase system output capacity and to maintain a required air temperature value at mobile thermostat 1 location. When the room air temperature at mobile thermostat 1 location is getting above the thermostat high level setpoint temperature (in heating mode) and/or under the thermostat low level setpoint temperature (in cooling mode), the mobile thermostat switch #3 is closed and the mobile thermostat 1 generates the third signal 6, which is sent to the master controller. The master controller then sends a resultant signal 7 to heating system and/or resultant signal 8 to cooling system to respectively reduce system output capacity and to maintain a required air temperature value at mobile thermostat location 1. As soon as the extra switch 2 (override control switch) in mobile thermostat 1 is opened, mobile thermostat 1 gets deenergized and thus, first signal 3 is terminated. After first signal 3 is terminated the master controller closes all its signal input ports, except the input ports dedicated to receive signals from stationary thermostat 4. Then the procedure which was described respectively to control functions of mobile thermostat 1 (switches #2 and #3) repeats itself while control is implemented by stationary thermostat 4 (switches #4 and #5). Developed space heating and space cooling control can be implemented by using for the master controller a standard Control devices manufactured, for example, by Allen-Bradley Rockwell International Company (USA).

The preceding embodiment is representative of the invention. It is to be understood, however, that other expedients known to those skilled in the art or disclosed herein may be employed without departing from the spirit of the invention or the scope of the appended claims.

Having explained the invention what I claim as new is:

1. A building air temperature control for space heating and/or space cooling system having a central heating and/or cooling sources, the said building having a plurality of rooms serviced from the said central heating and/or cooling sources, means to automatically change units heating and/or cooling capacity, the said rooms of the building having at least two air temperature thermostats to control air temperature to provide adequate heating and/or cooling to the rooms, one of the said air temperature thermostats is a stationary thermostat permanently installed in the room and another one is a mobile thermostat located at any place in the building to control air temperature in any of the building's rooms, the said mobile thermostat having authority to control air temperature in any room in the building, means provided so that only one thermostat controls room air temperature at any particular time, the said thermostats having means responsive to the current room air temperature value at the location of the thermostats, the said,thermostats having low and high temperature setpoints means, such that when the air temperature in the room at the thermostat location deviates from the said thermostat temperature setpoints the said thermostat generates the signal, the said signal is in proportion to the difference between the thermostat temperature setpoint and the air temperature in the room at thermostat location, the said signal is sent to the master controller, the said master controller having means to receive signals from the said thermostats and to send signals to building central heating and/or cooling system or to room heating and/or cooling system to change their output capacity to satisfy the thermostat's air temperature requirements.

2. The control of claim 1 wherein the is a non inertial thermostat which instantly responds to air temperature change in the room at thermostat location, said mobile thermostat can be located on different surfaces of the different rooms inside of building, said mobile thermostat having electrical energy source from stationary electrical network or battery energy source, said mobile thermostat having three normally opened switches, the said first switch serves to energize mobile thermostat operation, said second and third thermostat switches serve for room space heating and/or room space cooling mode control, such that when the first of the said switches is energized the said mobile thermostat permanently generates first signal which is sent to the master controller, the said master controller, upon receiving the first signal from mobile thermostat, overrides control of said stationary thermostat on behalf of mobile thermostat, the second and the third switches of the said mobile thermostat are periodically energized when a room air temperature at the thermostat location is lower than the mobile thermostat low level setpoint temperature (in heating mode) and/or is higher than the mobile thermostat high level setpoint temperature (in cooling mode), as a result of energizing of one of the said switches (switch #2) the second signal is generated, the said signal then is sent to the master controller, the said master controller then sends a resultant signal to building central heating and/or cooling system or to a room heating and/or cooling unit to increase their output capacity, the third switch (switch #3) of said mobile thermostat is energized when a room air temperature at a thermostat location is higher than the mobile thermostat high level setpoint temperature (in heating mode) and/or is lower than the mobile thermostat low level setpoint temperature (in cooling mode), as a result of energizing of said switch the third signal is Generated, the said signal then is sent to the master controller, the said master controller then sends a resultant signal to building central heating and/or cooling system or to a room heating and/or cooling unit to reduce their output capacity.

3. The said stationary thermostat of claim 1 is permanently installed on an internal wall in a room of the building or in a representative room of the building to stabilize controlled room air temperature, the said stationary thermostat is designed to control room air temperature when the mobile thermostat is deenergized, the said stationary thermostat is also used in a start up procedure and to tune up a heating and/or cooling system to provide a predetermined level of heating and/or cooling medium distribution into the room or building, the said thermostat having two switches to control room or building heating and/or cooling modes of operation, when the first signal from mobile from the mobile thermostat is terminated, said master controller overrides said mobile thermostat, the switches of said thermostat are periodically energized when a room air temperature at the thermostat location is lower than the stationary thermostat low level setpoint temperature (in heating mode) and/or is higher than the stationary thermostat high level setpoint temperature (in cooling mode), as a result of energizing of one of the said switches (switch #4) a fourth signal is generated, fourth said signal then is sent to the master controller, the said master controller then sends a resultant signal to the building central heating and/or cooling system or to a room heating and/or cooling unit to increase their output capacity, the second switch of the said stationary thermostat (switch #5) is energized when a room air temperature at a thermostat location is higher than the stationary thermostat high level setpoint temperature (in heating mode) and/or is lower than the stationary thermostat low level setpoint temperature (in cooling mode), as a result of energizing of said switch a fifth signal is generated and is sent to the master controller, the said master controller then sends a resultant signal to the building central heating and/or cooling system or to a room heating and/or cooling unit to reduce their output capacity.

4. The master controller wherein the claim 2, having five inlet channels and two outlet channels to receive signals from said mobile or stationary thermostats and to send a resultant signal to change the output capacity of the heating and/or cooling system to match the said system output capacity to that which is required by the room at any particular time, when the said master controller receives the first signal from the said mobile thermostat, its inlet channels number 2 and number 3 are opened and its inlet channels number 4 and number 5 are closed, thus, as soon as the first signal is received by the master controller, the said mobile thermostat has become solely responsible for control of the room air temperature, the signals received through the channels number 2 and number 3 at first may get through a signal amplifier to enhance the said signals to the value that is required by the said master controller to be able to identify the signal, as soon as the first signal from the said mobile thermostat is terminated, the said master controller closes its inlet channels number 2 and number 3 for reception and opens its inlet channels number 4 and number 5 for reception, thus the said stationary thermostat has become solely responsible for control of the room air temperature.

\* \* \* \* \*